(12) United States Patent
Tang

(10) Patent No.: US 8,077,451 B2
(45) Date of Patent: Dec. 13, 2011

(54) SURFACE CONTACT CARD RETENTION ASSEMBLY

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 336 days.

(21) Appl. No.: 12/399,215

(22) Filed: Mar. 6, 2009

(65) Prior Publication Data
US 2010/0110648 A1    May 6, 2010

(30) Foreign Application Priority Data
Oct. 31, 2008  (CN) .......................... 2008 1 0305335

(51) Int. Cl.
  *G06F 1/16*   (2006.01)
  *H05K 1/14*   (2006.01)
  *H01R 13/62*  (2006.01)
  *H01R 31/08*  (2006.01)

(52) U.S. Cl. .............. 361/679.32; 361/679.31; 361/737; 439/331; 439/509

(58) Field of Classification Search .................. 361/816, 361/679.31–679.32, 759, 752–753, 737, 361/756, 726, 732, 740–741, 747, 801–803, 361/686, 818; 348/375; 455/558, 575.1–575.4
See application file for complete search history.

(56) References Cited

U.S. PATENT DOCUMENTS

| | | | | |
|---|---|---|---|---|
| 6,461,193 | B1 * | 10/2002 | Matthies | 439/509 |
| 6,969,282 | B2 * | 11/2005 | Liu | 439/630 |
| 7,244,135 | B2 * | 7/2007 | Chen et al. | 439/327 |
| 7,372,136 | B2 * | 5/2008 | Yang et al. | 257/679 |
| 7,407,414 | B2 * | 8/2008 | Zuo et al. | 439/630 |
| 7,583,514 | B2 * | 9/2009 | Zuo et al. | 361/801 |
| 7,699,659 | B2 * | 4/2010 | Chen et al. | 439/630 |
| 2004/0132493 | A1 * | 7/2004 | Lin | 455/558 |
| 2006/0194466 | A1 * | 8/2006 | Yang et al. | 439/325 |
| 2008/0132120 | A1 * | 6/2008 | Tsai | 439/630 |

FOREIGN PATENT DOCUMENTS
TW           563972 U    11/2003
* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A retention assembly for securing a surface contact card in a portable electronic device includes a main body defining a receiving groove in the main body, and a locking member slidably positioned on the main body adjacent to the receiving groove. The locking member is slidable from a first position at a side of the receiving groove to a second position on a top of the receiving groove, and is latched at the second position, thereby pressing opposite ends of the surface contact card.

12 Claims, 6 Drawing Sheets

SURFACE CONTACT CARD RETENTION ASSEMBLY

BACKGROUND

1. Technical Field

The present disclosure generally relates to retention assemblies for securing a surface contact card, such as a subscriber identification module card, to a portable electronic device.

2. Description of Related Art

Surface contact cards, such as subscriber identity module cards (SIM), compact flash cards, and multimedia cards having special circuits, are widely used in portable electronic devices, such as mobile telephones, to enhance or specialize the functions of the portable electronic devices. For example, a SIM card is placed in a mobile phone to dedicate the mobile phone's functions to the SIM card owner.

Referring to FIG. 6, a typical retention assembly (not labeled) for securing a SIM card (not shown) in a mobile telephone includes a base plate 82, and a locking member 84. The base plate 82 defines a receiving groove 821, and includes a connector 80 positioned on a bottom surface of the receiving groove 821. A shape and size of the receiving groove 821 matches the SIM card, so that the SIM card can be received in the receiving groove 821 and electronically connected to the connector 80. The locking member 84 is positioned on the base plate 82 adjacent to the receiving groove 821 and can be moved back and forth along the direction as indicated by the arrow shown in FIG. 6.

When the locking member 84 is moved away from the receiving groove 821, the SIM card may be received in the receiving groove 821 and released from the receiving groove 821. The locking member 84 may be moved adjacent to the receiving groove 821 to lock the SIM card in the receiving groove 821.

However, in the typical retention assembly, the locking member 84 can be moved inadvertently. For example, if the mobile telephone drops to the ground, a shock may force the locking member 84 to move away from the receiving groove 82. As a result, the SIM card will not be sufficiently connected with the connector 80 or released from the receiving groove 821. Therefore, such a retention assembly can not adequately maintain the SIM card in the receiving groove 821.

Therefore, a retention assembly which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

The present retention assembly may be used for securing a surface contact card in a portable electronic device. Hereinafter, for the purposes of conveniently describing the embodiments of the retention assembly, the retention assembly as used for securing a SIM card in a mobile phone is described and illustrated.

Figure 1:
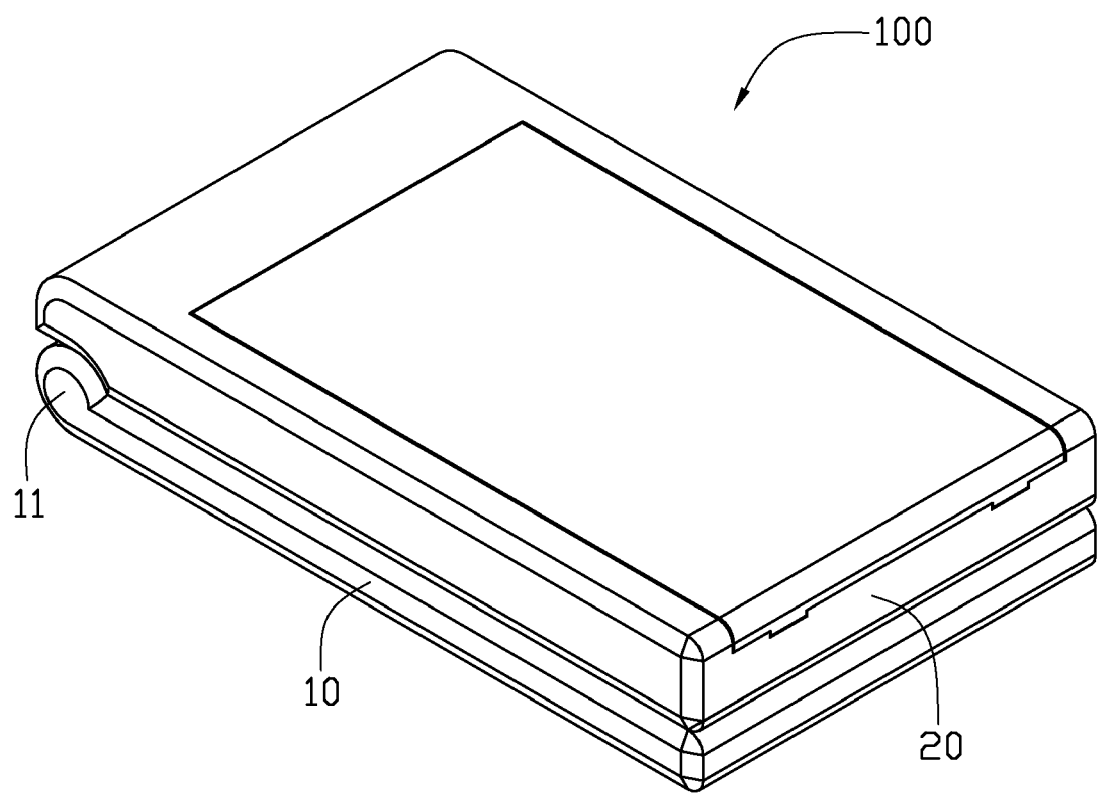
FIG. 1 is an assembled, isometric view of an embodiment of a mobile phone, the mobile phone including an embodiment of a retention assembly, and a SIM card.
Figure 2:
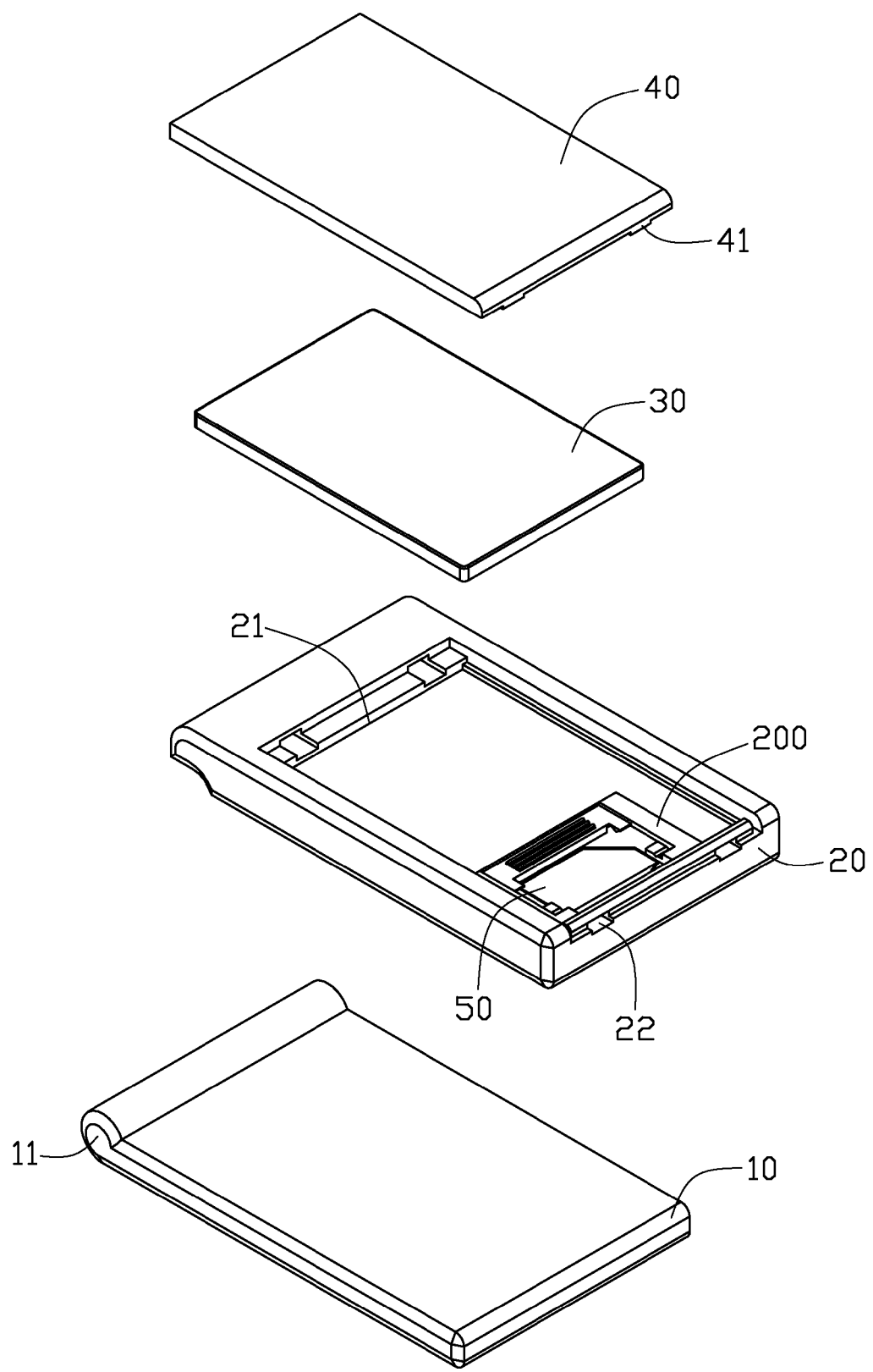
FIG. 2 is an exploded, isometric view of the mobile phone in FIG. 1.

Referring to FIGS. 1 and 2, an embodiment of a mobile phone 100 includes a first main body 10, a second main body 20, a battery 30, a battery cover 40, a SIM card 50, and an embodiment of a retention assembly 200. The second main body 20 is pivotally connected to the first main body 10 via a hinge 11. The second main body 20 defines a battery groove 21 to receive the battery 30, and a plurality of latching grooves 22 adjacent to the battery groove 21. The battery cover 40 forms a plurality of latching hooks 41 to engage in the latching grooves 22 of the second main body 20, thus shielding the battery 30. The SIM card 50 is secured in the battery groove 21 by the retention assembly 200.

Figure 3:
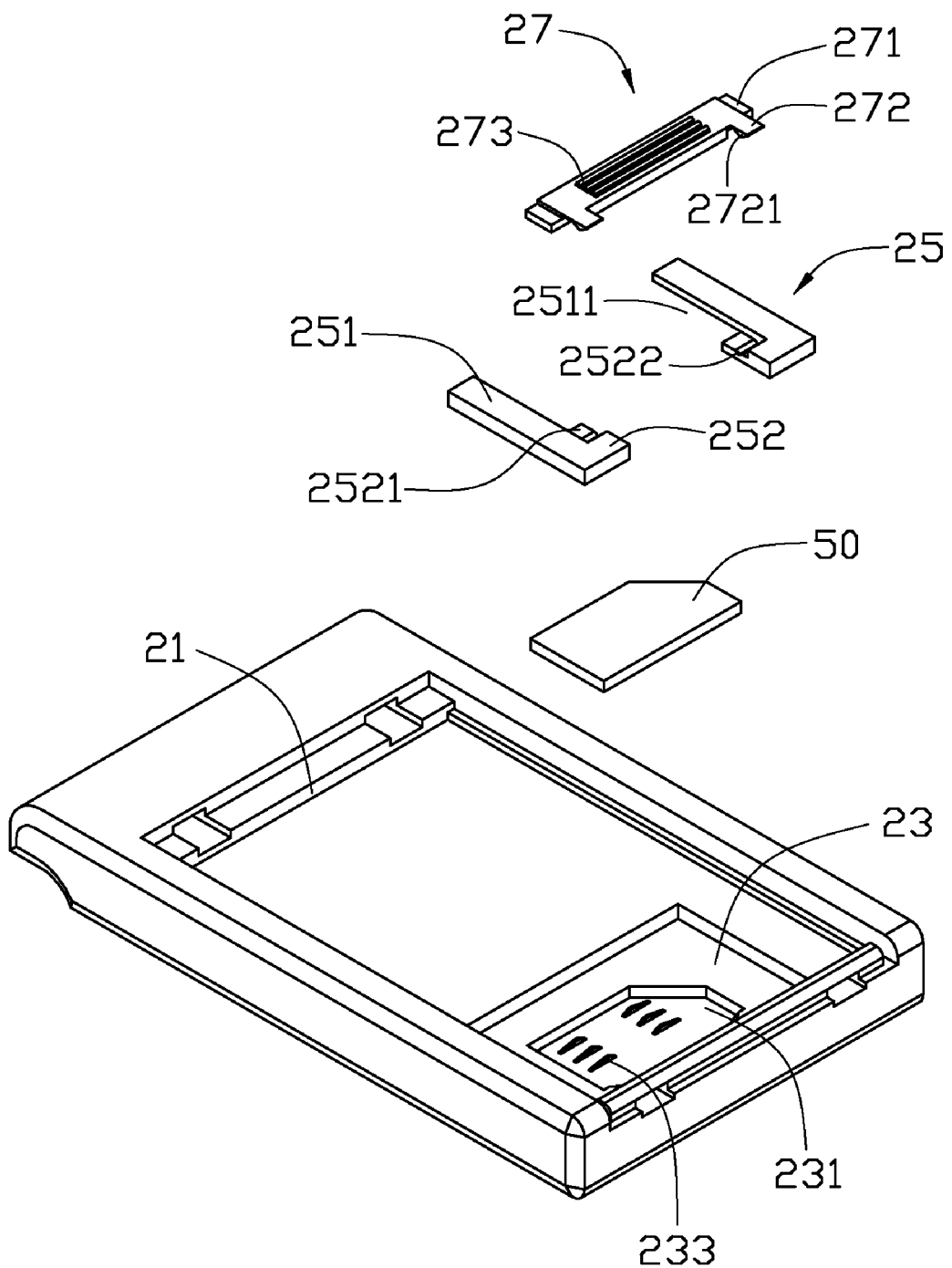
FIG. 3 is an exploded, isometric view of the retention assembly of the mobile phone in FIG. 2.

Referring to FIG. 3, the retention assembly 200 includes a pair of fixing members 25, and a locking member 27. A mounting groove 23 is defined in a bottom surface of the battery groove 21, to receive the fixing members 25 and the locking member 27. A receiving groove 231 is defined in a bottom surface of the mounting groove 23, to receive the SIM card 50.

A plurality of contacts 233 are positioned on a bottom surface of the receiving groove 231. The contacts 233 may be metallic elastic pieces. The receiving groove 231 has a shape substantially the same as a shape of the SIM card 50, so that the SIM card 50 can be received in the receiving groove 231 and electrically connected to the contacts 233. A depth of the receiving groove 231 is substantially equal to a thickness of the SIM card 50. In one embodiment, the bottom surface of the mounting groove 23 also defines an arched groove 232 (shown in FIG. 4) communicating with the receiving groove 231, to facilitate assembling or disassembling the SIM card 50 from the receiving groove 231.

Each fixing member 25 is substantially L-shaped, and includes a limiting portion 251 and a connecting portion 252 extending substantially perpendicularly from a side of the limiting portion 251. The limiting portion 251 defines a recess 2511 in a bottom surface of the limiting portion 251. Thus, when the fixing member 25 is fixed in the mounting groove 23, the limiting portion 251 and the bottom surface of the mounting groove 23 cooperatively define a sliding groove 253 (shown in FIG. 4). Alternatively, the sliding groove 253 may be directly defined in the limiting portion 251. The connecting portion 252 has a stepped surface 2521, and defines a latching groove 2522 in the stepped surface 2521. In an alternative embodiment, the pair of the fixing members 25 may be integrally formed with the second main body 20.

The locking member 27 may be a substantially elongated plate, and includes two sliding blocks 271 formed on opposite ends of the locking member 27. A thickness of the sliding block 271 is substantially equal to or smaller than a height of the sliding groove 253, such that the sliding block 271 is slidable in the sliding groove 253. The locking member 27 further includes two positioning portions 272 formed on a side of the locking member 27. The positioning portions 272 are adjacent to the sliding block 271, and each positioning portion 272 forms a latching protrusion 2721 on a bottom surface of the positioning portion 272 to engage in the latching groove 2522. Alternatively, the latching protrusion 2721 may be formed on the stepped surface 2521, and the latching groove 2522 may be defined in the bottom surface of the positioning portion 272. A handling portion 273 is formed on a top surface of the locking member 27 to facilitate operation of the locking member 27. In the illustrated embodiment, the handling portion 273 is a plurality of protruding ribs. In an alternative embodiment, the handling portion 273 may be other desired structures, such as a rough area, or a groove.

Figure 4:
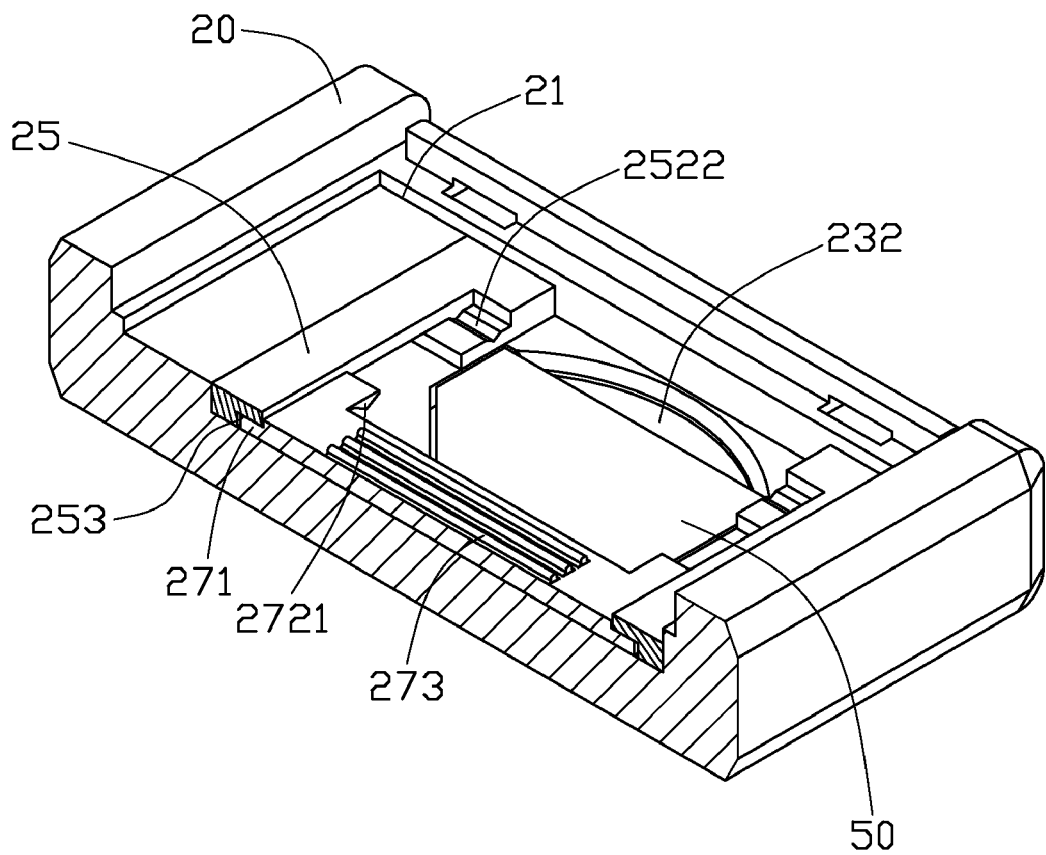
FIG. 4 is a cross-sectional, isometric view of the retention assembly of the mobile phone in FIG. 2.

Referring also to FIG. 4, the fixing members 25 are fixed in two ends of the mounting groove 23. The sliding blocks 271 of the locking member 27 are slidably inserted in the sliding grooves 253. Initially, the locking member 27 is positioned at a side of the receiving groove 231, the SIM card 50 is positioned in the receiving groove 231.

Figure 5:
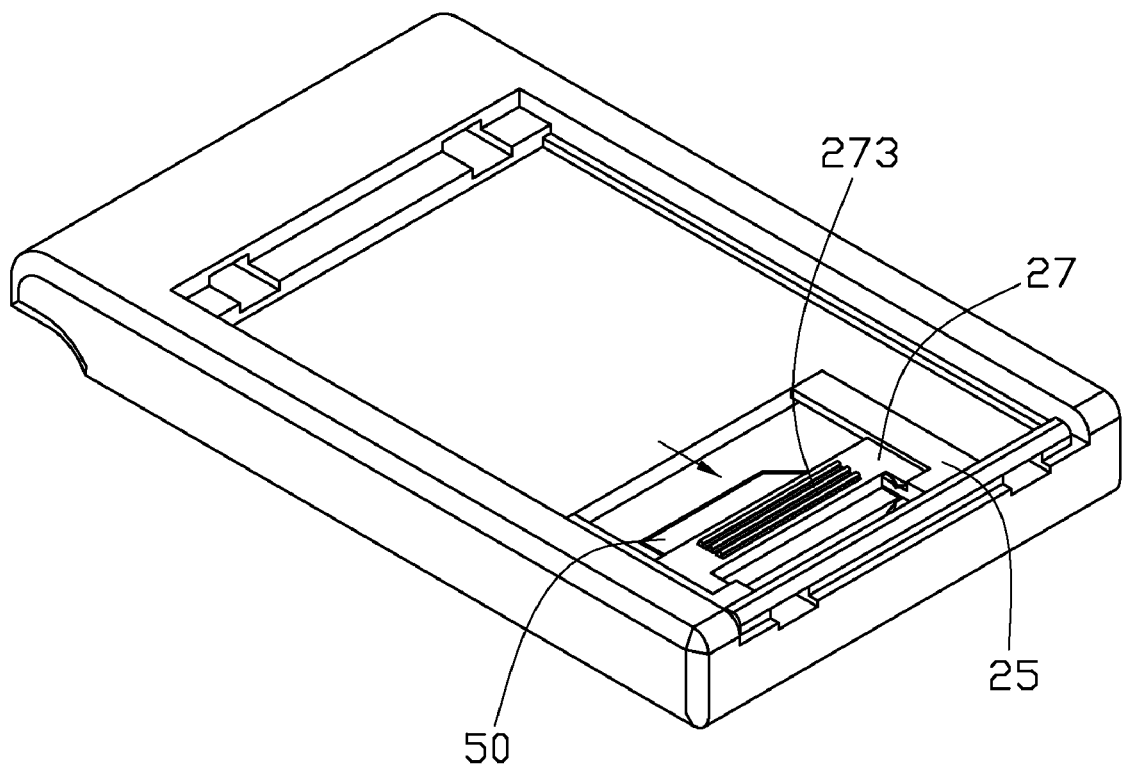
FIG. 5 is an assembled, isometric view of the retention assembly of the mobile phone in FIG. 3, showing the SIM card secured in the retention assembly.
Figure 6:
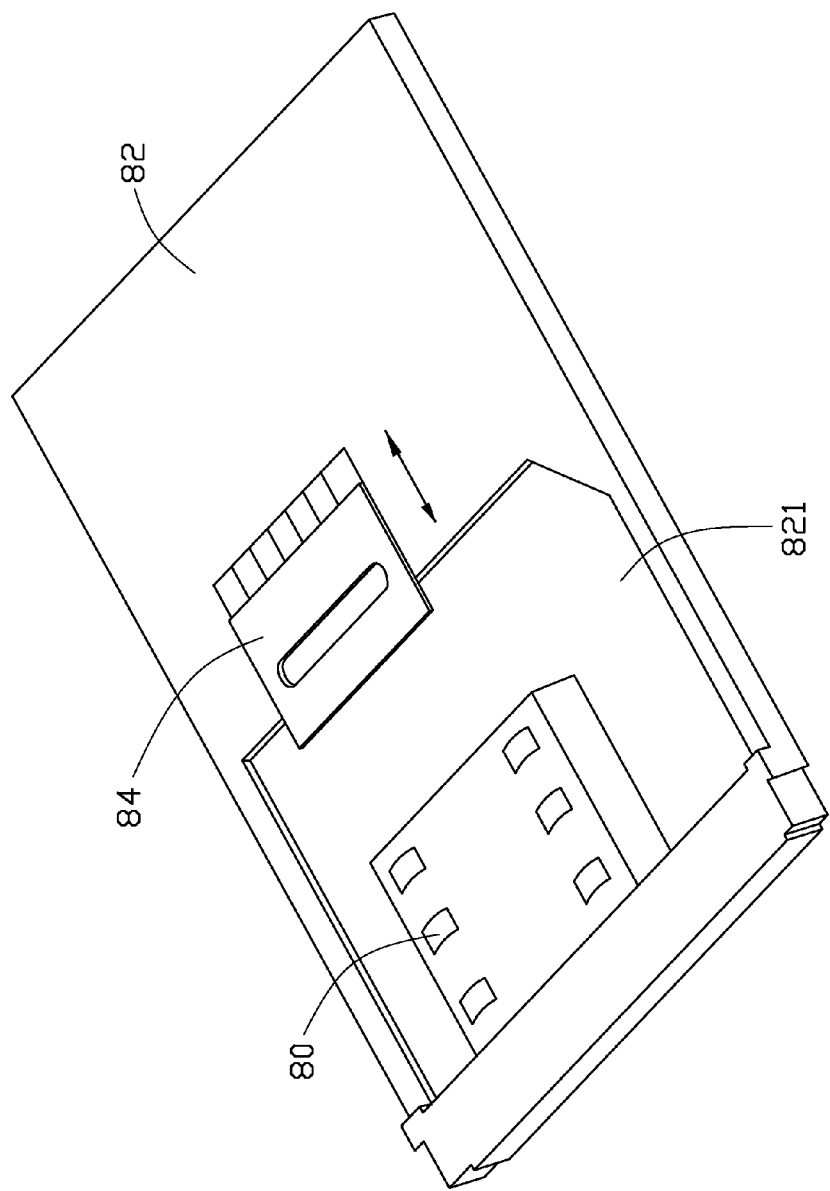
FIG. 6 is an assembled, isometric view of a typical retention assembly.

Referring also to FIG. 5, the handling portion 273 may be pushed by an external force, so that the sliding blocks 271 slide along the sliding grooves 253. The locking member 27 moves along the direction as indicated by the arrow, until the latching protrusions 2721 of the locking member 27 engage in the latching grooves 2522 of the fixing members 25, and the locking member 27 is positioned on a top of the receiving groove 231, and pressing opposite ends of the SIM card 50. Therefore, the SIM card 50 is secured in the receiving groove 231 via a force created by the locking member 27 and the elastic force created by the contacts 233. The SIM card 50 is reliably secured in the receiving groove 231 because the opposite ends of the SIM card 50 are pressed by the locking member 27. Moreover, the locking member 27 is firmly latched on the fixing members 25, so that the locking member 27 has a good shock resistance capability.

The SIM card 50 can be easily removed from the receiving groove 231 by pushing the locking member 27 towards the sides of the receiving groove 231. The SIM card 50 is partially pushed out of the receiving groove 231 by the elastic force created by the contacts 233.

In other alternative embodiments, the sliding grooves 253 may be defined in opposite sidewalls of the mounting groove 23. Two latching portions having the latching grooves 2522 may be formed on the bottom surface of the mounting groove 23 adjacent to the receiving groove 231. Thus, the pair of fixing members 25 may be omitted.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A retention assembly for securing a surface contact card in a portable electronic device, the retention assembly comprising: a main body defining a receiving groove therein; a pair of fixing members positioned on opposite sides of the receiving groove; and a locking member slidably positioned on the fixing members and adjacent to the receiving groove, the locking member being slidable from a first position at a side of the receiving groove to a second position on a top of the receiving groove, and being latched at the second position, thereby pressing opposite ends of the surface contact card; wherein the main body defines a mounting groove therein; the receiving groove is defined in a bottom surface of the mounting groove; wherein each fixing member comprises a limiting portion, and defines a recess in a bottom surface of the limiting portion; the limiting portion and the bottom surface of the mounting groove cooperatively define a sliding groove there between; a sliding block is formed on the locking member; the sliding block is slidably inserted in the sliding groove; and wherein each fixing member comprises a connecting portion extending substantially perpendicularly from the limiting portion; the connecting portion has a stepped surface; a latching groove is defined in the stepped surface; a latching protrusion is formed on the locking member to engage in the latching groove.

2. The retention assembly of claim 1, wherein each fixing member defines a sliding groove therein; a sliding block is formed on the locking member; the sliding block is slidably inserted in the sliding groove.

3. The retention assembly of claim 1, wherein the locking member comprises a handling portion formed thereon to facilitate operation of the locking member.

4. The retention assembly of claim 3, wherein the handling portion is a plurality of protruding ribs.

5. The retention assembly of claim 3, wherein the handling portion is a rough area, or a groove.

6. The retention assembly of claim 1, wherein the bottom surface of the mounting groove defines an arched groove communicating with the receiving groove.

7. The retention assembly of claim 1, wherein a sliding groove is defined in a sidewall of the mounting groove; a sliding block is formed on the locking member, and the sliding block is slidably inserted in the sliding groove.

8. The retention assembly of claim 1, wherein a latching portion is formed on the bottom surface of the mounting groove, adjacent to the receiving groove; the latching portion defines a latching groove therein; a latching protrusion is formed on the locking member to engage in the latching groove.

9. A retention assembly for securing a surface contact card in a portable electronic device, the retention assembly comprising: a main body defining a mounting groove therein, and a receiving groove in a bottom surface of the mounting groove; a pair of fixing members fixed in the mounting groove and on opposite sides of the receiving groove, wherein the fixing members and the bottom surface of the mounting groove cooperatively define a sliding groove there between; and a locking member forming a sliding block thereon, wherein the sliding block is slidably inserted in the sliding groove; the locking member being slidable from a first position at a side of the receiving groove to a second position on a top of the receiving groove, and being latched at the second position, thereby pressing opposite ends of the surface contact card; wherein each fixing member comprises a limiting portion, and defines a recess in a bottom surface of the limiting portion; the limiting portion and the bottom surface of the mounting groove cooperatively define the sliding groove; and wherein each fixing member comprises a connecting portion extending substantially perpendicularly from the limiting portion; the connecting portion has a stepped surface; a latching groove is defined in the stepped surface; a latching protrusion is formed on the locking member to engage in the latching groove.

10. The retention assembly of claim 9, wherein the locking member comprises a handling portion formed thereon to facilitate operation of the locking member.

11. The retention assembly of claim 10, wherein the handling portion is a plurality of protruding ribs.

12. The retention assembly of claim 9, wherein the bottom surface of the mounting groove defines an arched groove communicating with the receiving groove.

* * * * *